United States Patent [19]
Ludwig, deceased

[11] 3,733,834
[45] May 22, 1973

[54] DYNAMIC DAMPER FOR OFFSHORE STRUCTURES

[76] Inventor: Ludwig Ludwig, deceased, late of 110 St. Albans Road, Berkeley, Calif. 94708 by Gina L. Cline, executrix

[22] Filed: May 1, 1972

[21] Appl. No.: 249,429

Related U.S. Application Data

[63] Continuation of Ser. No. 139,075, April 30, 1971.

[52] U.S. Cl. ..........................61/46, 52/40, 61/50, 114/124, 175/7, 175/9
[51] Int. Cl. .............................................E02d 21/00
[58] Field of Search .................61/46.5, 46, 5, 50, 61/52, 65; 175/5, 7, 9; 166/177; 114/124; 52/40, 593, 697

[56] References Cited

UNITED STATES PATENTS

| | | | |
|---|---|---|---|
| 3,248,886 | 5/1966 | Blenkarn | 61/46 |
| 3,605,105 | 9/1971 | Penzias | 52/40 |
| 3,670,515 | 6/1972 | Lloyd | 61/46.5 |

*Primary Examiner*—Jacob Shapiro
*Attorney*—A. L. Snow et al.

[57] ABSTRACT

Apparatus for dynamically damping the vibrations of a marine structure in which oscillation is induced by the impact of periodically occurring wave forces. In the preferred embodiment, a massive pendulum is used and is tuned to be forced into synchronous vibration at the critical stages of oscillation of the marine structure. A viscous fluid restrains the swing of the pendulum and thus dissipates energy from the marine structure to thereby control the amplitude of its oscillation.

14 Claims, 7 Drawing Figures

Patented May 22, 1973

INVENTOR
MILTON LUDWIG

BY Charles J. Gibeau
Ralph L. Freeland Jr.
ATTORNEYS

INVENTOR
MILTON LUDWIG
BY Charles J. Gibeau
Ralph L. Freeland Jr.
ATTORNEYS

DYNAMIC DAMPER FOR OFFSHORE STRUCTURES

This is a continuation of application Ser. No. 139,075, filed Apr. 30, 1971.

BACKGROUND OF THE INVENTION

This invention relates to marine structures particularly for deep water installations and is directed primarily to apparatus for holding the oscillations and vibrations of such a structure within allowable design limits when the structure is responding to the impact of wave forces. This invention is particularly concerned with apparatus for adding to the effective damping of and holding within allowable limits of amplitude the oscillations of the structure when it attempts to respond at its natural period of vibration when subjected to wave forces such as those generated by storm waves. Of particular interest for applications of the present invention are marine structures which are placed in offshore locations for the purpose of recovering oil from submerged lands.

Offshore drilling and production platforms have been successfully installed and employed in open waters several hundred feet deep. As the platforms are designed for increasingly deeper waters, the susceptibility of the structure to aggravated vibration and oscillation under the impact of wave forces becomes more acute. Severe vibrations can result in the catastrophic destruction of the platform. Oscillations of pronounced acceleration, velocity or displacement can cause uncomfortable or impossible conditions for the workmen on the platform and result in malfunctioning of mechanical equipment.

The effects of wave impact on the platform can be alleviated to some degree by increasing the structural stiffness of the platform through the use of more massive structural members to keep its natural period below the range of wave periods. This, however, leads to several undesirable results, one of which is the increased cost of such a platform, and another the increased difficulty of installing such a platform in a deep, open-water location.

It will be apparent that the conditions which the present invention is designed to alleviate are not the same as those experienced by a freely floating vessel under the influence of wave forces. The floating vessel moves with the surface of the water and the resulting motions of roll, pitch and heave are usually the significant ones. Devices have been developed for stabilizing the floating vessel against these motions. However, when the offshore platform is constructed in a fixed position, the periodic wave forces impacting on the structure produce vibrations and oscillations which can be critical to the structural safety and operability of the fixed platform, although similar wave forces might be of negligible importance in relation to the fully floating vessel.

SUMMARY OF THE INVENTION

It is an object of this invention to provide apparatus which will control the vibrations and oscillations of a relatively fixed marine structure exposed to the impact of wave forces to hold such vibrations and oscillations below a level which would be damaging to the structure or create an environment which would make it uncomfortable or impractical for the workmen to function on the structure.

The inventive concept includes an auxiliary mass which is mounted on the structure and which will be forced to move relative to the structure by the vibrations of the latter. A restraining means is provided to resist the movement of the mass relative to the structure to thus dissipate energy which is imparted to the mass by the structure. As a result, the mass will resist the movement of the structure and hence damp the vibrations of it.

In a preferred embodiment, the auxiliary mass comprises a pendulum which is pivotally mounted in a bearing fixed to the structure so that the pendulum will be set in swinging motion by vibrations and oscillations of the structure. Preferably, for structures with omnidirectional symmetry, a bearing is provided which permits universal azimuthal motion of the pendulum. A viscous liquid is provided to damp the swinging motion of the pendulum and absorb and dissipate the energy from it. This arrangement functions as a brake to reduce and control the vibrations and oscillations of the structure. The apparatus provides for adjusting the length of the pendulum so that it may be tuned to respond preferentially to the natural periods of vibration and oscillation of the structure thereby to damp most effectively the excursions of the structure which would be critical to the safety and operability of it.

DESCRIPTION OF THE PREFERRED EMBODIMENT

Figures 1, 2:
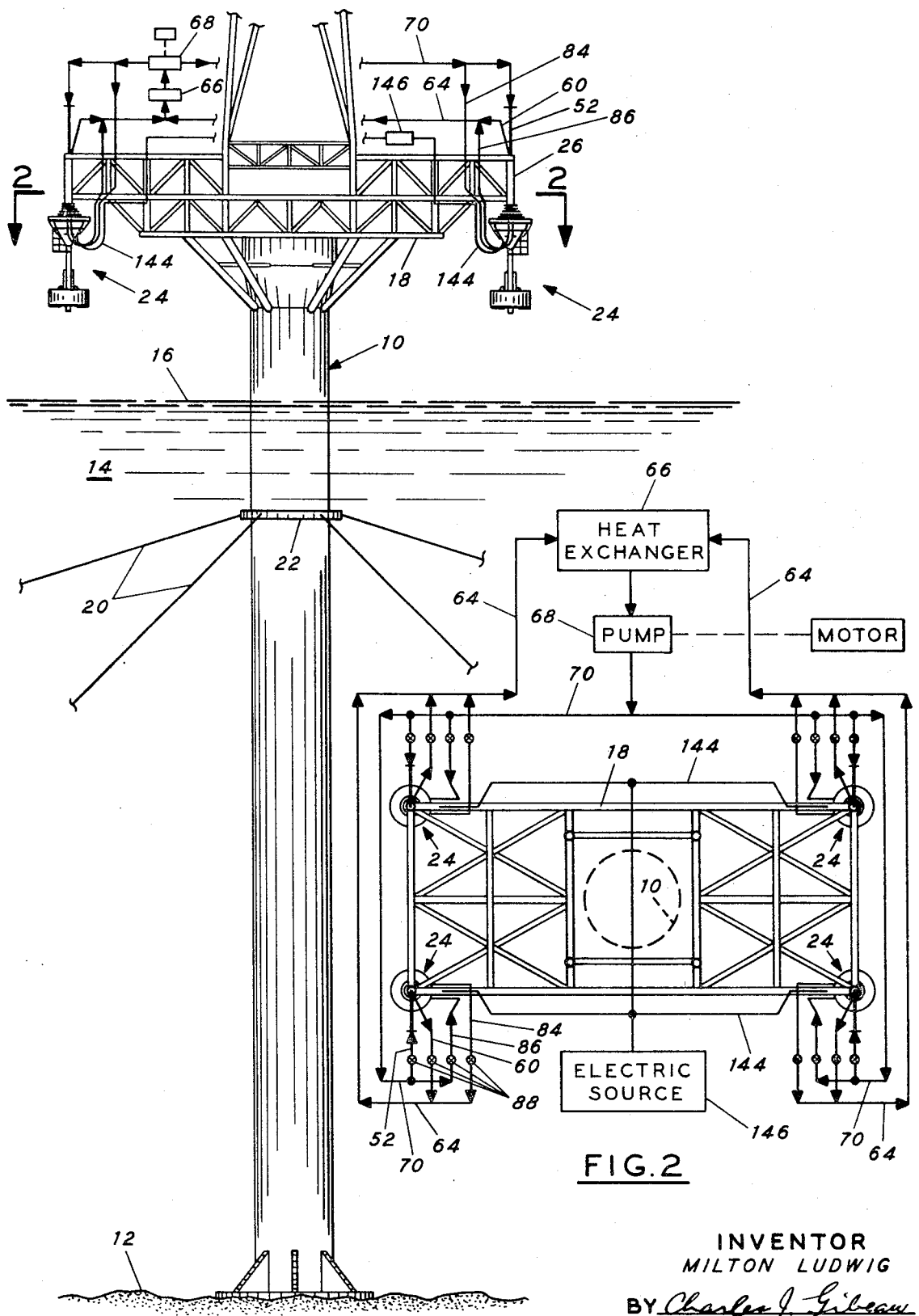
FIG. 1 is a schematic view in elevation of an assembly embodying the invention as applied to a fixed offshore platform.
FIG. 2 is a schematic plan view taken approximately along the line 2—2 of FIG. 1 and illustrates the possible distribution of a plurality of damping apparatus applied to the platform.

FIG. 1 illustrates an offshore drilling platform designed for installation in depths of approximately 600 feet to 1,000 feet of water. The platform is supported by a single columnar mast 10, which is seated in a fixed position on the underwater bottom 12 and extends vertically through the body of water 14 to above the surface 16 of it to support a platform deck 18 above the area of wave action. The platform deck may comprise several levels of working deck area, as will be understood in the art. The bottom end of the mast 10 is secured to the underwater bottom by piles or well casing, not shown, which are cemented to the earth and secured fixedly to the mast. Anchor or guy lines 20 are secured to a collar 22 positioned in the upper portion of the mast to maintain it in vertical position against the action of tidal currents and wind and wave forces. The deck 18 and the appurtenances attached to it will be positioned sufficiently above the normal water surface level to be clear of the storm waves expected at the particular offshore location. Thus, for example, the lowest portion of the deck assembly may be set 50 feet above mean lower low-water level.

A platform designed for installation in 600 feet of water may, for example, have a columnar support mast with an outside diameter of approximately 28 feet and support a deck load of 6,600 kips (wherein a "kip" equals 1,000 pounds) while drilling. Since the structure is fixed to the underwater bottom, it will have vibration characteristics similar to that of a beam having one end fixed and the other spring supported (i.e., the guy lines). Depending on the specific construction, dimensions and loading of the offshore installation, the structure will have a natural period of vibration in the range of 4–10 seconds per cycle. Ocean waves having periods comparable to this become significant waves in relation to this platform. Thus some ocean waves have been measured and have been found to have, during these particular measurements, a period of 3 seconds for 5-foot waves, 4 seconds for 8-foot waves, 5.5 seconds for 16-foot waves and 14 seconds for 55-foot storm waves. Since water waves of a given height may have different periods under different conditions, these figures reflect measurements made at particular times at specific locations and particular water conditions, with water depths varying from 600 to 1,000 feet. The waves most significant to platform behavior are not, therefore, necessarily the largest waves, but are the waves which correspond to the natural frequency of oscillation of the structure and which will induce forced synchronous vibrations in the latter.

Dynamic effects can cause failure of a structure in several ways. In a lightly damped structure, resonant buildup can cause stresses high enough to fail members directly and cause collapse of the structure. Vibrations continuing over a period of time can also cause failure through fatigue of the structural material. The number of cycles to cause fatigue failure is dependent on such factors as stress level, stress history, stress concentrations and the corrosive nature of the environment. Fatigue failure can occur after only a very few cycles in some instances of improper design. It is desirable to reduce dynamic stress levels in an offshore platform of the type of present interest to below 20,000 pounds per square inch.

Another aspect of platform vibration or oscillation to be considered is the occurrence of excessive motions or accelerations. Such effects can interfere with the operation of equipment and cause discomfort for personnel. Human reaction to vibrations is a function of both the period and the acceleration level of the vibrations. An acceleration level in excess of 0.1 g. at the natural period of the platform would be unpleasant. For an offshore platform of the type illustrated and having, for example, a natural period of 6 seconds, these parameters would limit the permissible oscillatory deck deflections to a maximum of about 3 feet.

There is a certain amount of natural inherent damping capacity in all structures. For the support mast structure illustrated this capacity includes such factors as external water drag, hysteresis and internal friction in the mast and anchoring cables, and damping in the foundation. However, to develop an appreciable amount of this inherent damping capacity requires mast deflections that are excessive from the operating standpoint. This is particularly true for the water drag force which increases with the square of the mast deflection. Since it is desirable to keep deflections within a limited range for the reasons explained heretofore, only a nominal amount of inherent damping can be taken advantage of in the design analysis. The apparatus of the present invention supplements the inherent damping function and provides the additional damping effect to keep the vibrations and oscillations of the structure within the required limits.

In the assembly illustrated in FIG. 1, the guy or anchor lines 20 can be arranged to supply a damping effect which is additional to that of the inherent damping effect of the structure. However, ordinarily the anchoring system also produces a complication in that it, together with the structure it restrains from movement, also forms an elastic system which is susceptible to forced vibrations under periodically applied forces. The resonant frequency of this system can be within the frequency of ordinarily encountered ocean waves. The force imposed on such an anchoring system under non-resonant storm conditions can place a load of a million pounds or more on the anchor lines and a resonant condition can lead to destruction of the system. U.S. Pat. No. 2,986,889 issued June 6, 1961, discusses the anchoring problem and shows an anchoring system designed to alleviate these conditions.

With an anchoring system of the type illustrated schematically in FIG. 1 wherein the anchor lines 20 may be composed of wire cables which are attached at one end to the mast described heretofore and securely affixed to the underwater bottom at the other, there may be required to hold the structure within design limits of stress and vibration for water and weather conditions at a particular offshore location the equivalent of 4 auxiliary pendulum damping units 24 each weighing about 100,000 pounds and having each a braking capacity of approximately 25 h.p. However, except for the geometry of the distribution of the damping units on the marine structure assembly to achieve the desired damping effects, the number of units is not critical provided their total damping capacity is sufficient. For example, in some installations it may be desirable to attach damping units to the support mast proper below the deck 18, at a location which may be underwater, if the mast experiences peak deflections at that elevation under particular water and loading conditions. Displacement of the dampers from the deck 18 may be in place of or in addition to other damping units placed at the deck level. FIGS. 1 and 2 illustrate four damping units 24 distributed symmetrically at the corners of and attached to the deck assembly of the drilling platform.

Figure 3:
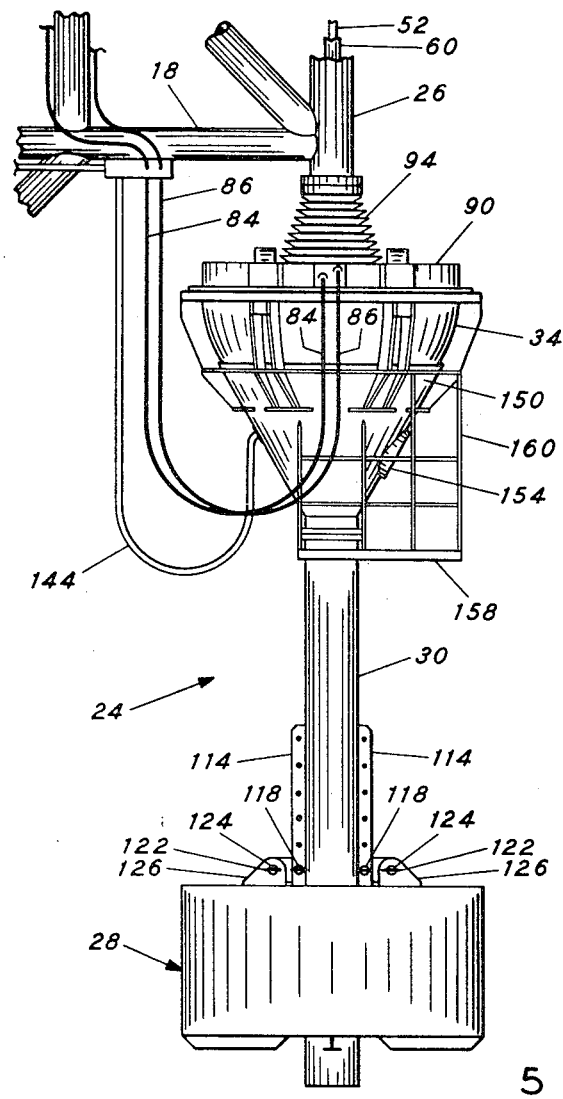
FIG. 3 is an enlarged view in elevation of a single one of the damping apparatus illustrated in FIG. 1.

FIG. 3 illustrates a damping unit 24 in enlarged exterior elevation. The unit is securely attached to the corner 26 of the deck support 18 of the drilling platform so that the vibrations of the platform will be transmitted to the pendulum. The pendulum comprises the massive weight 28 adjustably attached to the lower end of the pendulum arm 30, the upper end of which is connected to the gimbal 32, shown in FIGS. 6 and 7, which mounts the pendulum to swing in a universal azimuthal direction relative to the platform. Thus the pendulum is supported in a manner which permits it to swing in a direction which is responsive to a varying direction of oscillation of the marine structure.

Figure 6:
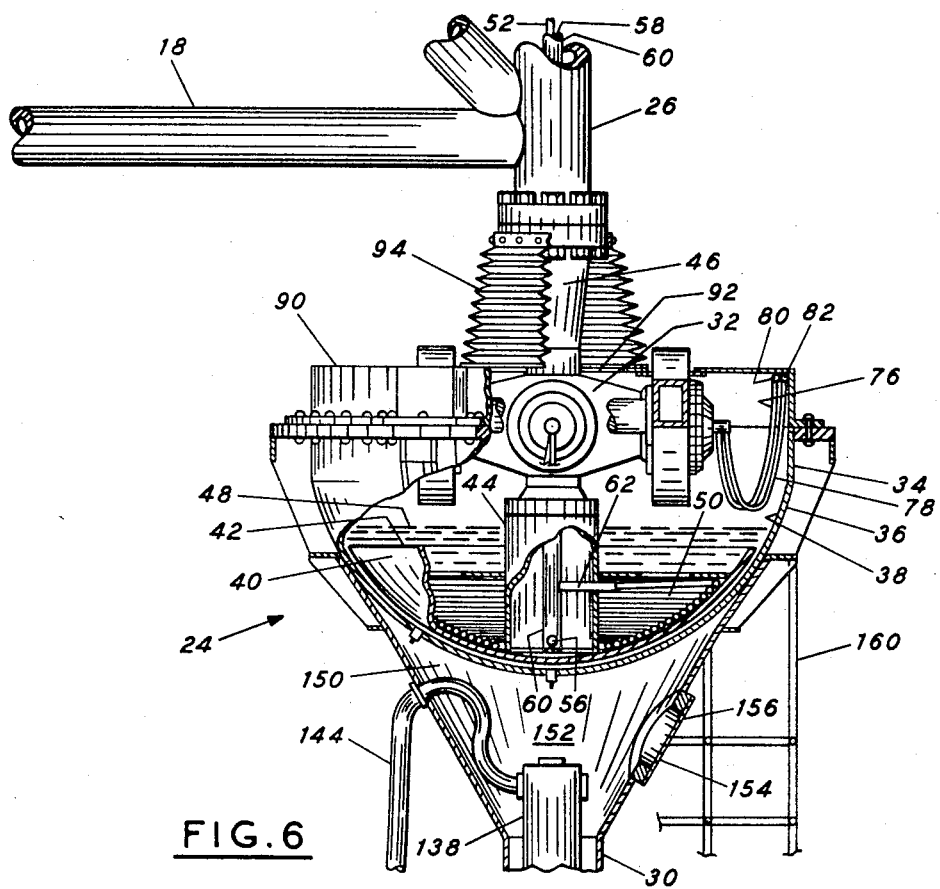
FIG. 6 is a view in elevation and partly in section showing details of the bearing mounting for the pendulum and the fluid damping system for it.
Figure 7:
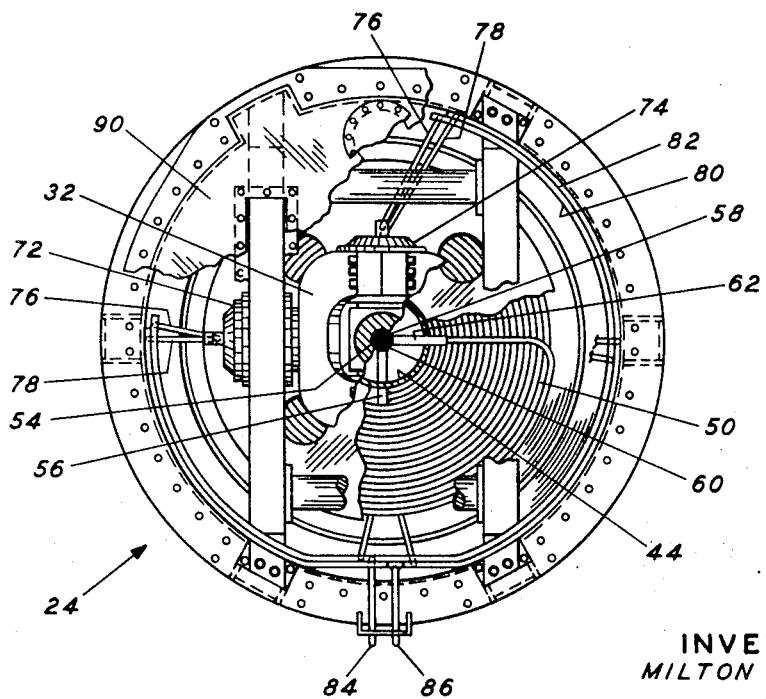
FIG. 7 is a plan view partly broken away and partly in section of the apparatus illustrated in FIG. 6.

In order to absorb the energy of the pendulum and thereby provide effective damping of the vibrations and oscillations of the drilling platform assembly, the apparatus is provided with restraining means to resist the swinging of the pendulum mass. As illustrated in FIGS. 6 and 7, the upper end portion 34 of the pendulum arm 30 is formed as a housing with a hemispherical plate 36 forming a bottom chamber containing an inner spherical surface 38, the center of which sphere is coincident with the center of the swinging motion of the pendulum mass. Placed radially inwardly of the surface 38 and spaced radially apart from it is a second spherical surface 40 formed on a substantially hemispherical plate 42. The plate 42 has a common center with plate 36 and, therefore, is concentric with it. The hemispherical plate 42 is rigidly secured to a central cylindrical support member 44, which is a continuation of and is rigidly attached to the support member 46 which, in turn, is fixedly connected to the corner member 26 of the deck structure of the drilling platform. Thus the spherical surface 40 remains stationary relative to the platform while the spherical surface 38 rotates angularly with the swinging pendulum. A viscous fluid 48 is placed within the chamber formed by the spherical plate 36 and occupies the space between the two spherical surfaces 38 and 40. These surfaces are placed in closely adjacent but spaced-apart relationship to produce sufficient shearing force in the viscous fluid to accomplish the desired damping action in the apparatus. For example, the radius of the surface 38 may be in the order of 5 feet and the space between the spherical surfaces may be in the order of one-fourth to three-eighths inch.

The energy absorbed by the damping fluid will be converted into heat and means are provided for cooling the viscous fluid particularly in the region between the spherical surfaces so that the fluid may retain its viscosity and provide the desired resistance to the swinging movement of the pendulum. To accomplish this, a coil of tubing 50 is wound upon and in close contact with the interior surface of the spherical plate 42. A cooling medium such as water or some other cooling fluid is forced through the coil to cool the plate 42 and hence to cool the viscous fluid between the spherical surfaces 38 and 40. The cooling fluid is pumped into the cooling coil through the tubing 52 which extends downwardly from the drilling platform through the corner support member 26 and through a central opening 54 in the gimbal as shown in FIG. 7 and into the cylindrical element 44 from which a lateral conduit 56 connects it with the end of the cooling tubing 50. The return flow is through the annulus 58 between the tubing 52 and the surrounding pipe 60, FIG. 6. This annulus is connected through the lateral conduit 62 with the other end of the tubing 50. Subsequently, the annulus 58 is connected with a conduit 64 on the drilling deck which conducts the cooling fluid to a heat exchanger 66, FIG. 2, where it is cooled prior to being recirculated through the system by a pump 68 and a return manifold 70.

The bearings for the gimbal are exposed to constant oscillatory and vibratory movements of the platform due both to wave action and to the operation of machinery on the platform. Thus they are exposed to fretting fatigue and fretting corrosion. These bearings must have sufficient capacity to hold the massive weight of the pendulum and to withstand the heavy breaking reaction of the fluid damping means described heretofore. Nevertheless, the pendulum must respond readily as the oscillations of the platform tend to increase significantly and the bearings must retain this ability over the years of life of the installation. A bearing known to the art having mating surfaces of bronze in contact with a sleeve of a perfluorocarbon, for example polytetrafluoroethylene (i.e., Teflon), is suitable for this installation. Because of the resinous component such a bearing has a limited heat capacity and hence means are provided for circulating a cooling medium through the gimbal bearings. As shown in FIG. 7, the bearings, as 72 and 74, are connected through conduits 76 and 78 with respective manifolds 80 and 82. The manifolds are connected through respective flexible conduits 84 and 86, FIG. 3, with the corresponding manifold conduits 64 and 70, FIG. 2, on the drilling platform. These latter conduits are also those which circulate the cooling fluid to the fluid brakes of the pendulums as described heretofore. Thus the same cooling fluid that is circulated through the fluid brakes is also circulated through the bearings. Appropriate valves 88 are placed in the various conduits to control the flow of the cooling fluid to the corresponding elements.

The upper end of the housing 34 is covered by the plate 90, which has a central opening 92 to accommodate the swing of the pendulum relative to the stationary support member 46. A flexible boot 94 extending between the stationary support member 46 and the cover plate 90 completes the closure of the housing 34 and protects its contents, particularly the viscous fluid 48 from contamination or dilution by water or debris.

Figure 5:
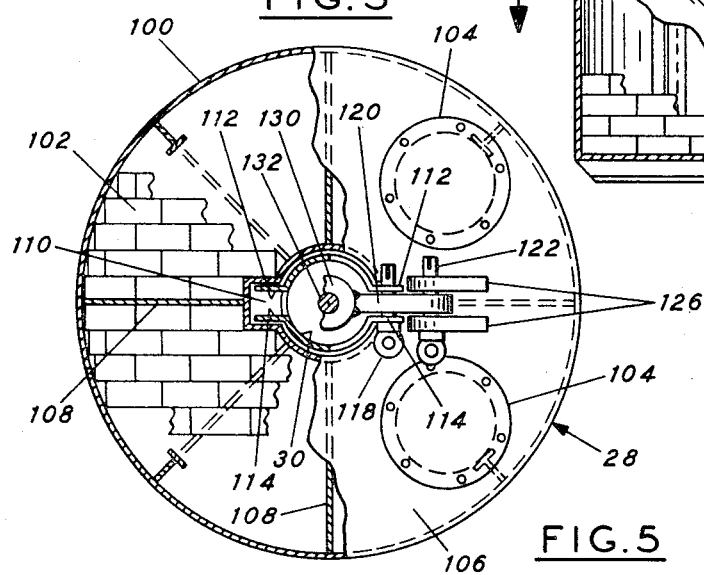
FIG. 5 is a plan view partly in section taken along the line 5—5 of FIG. 4.
Figure 4:
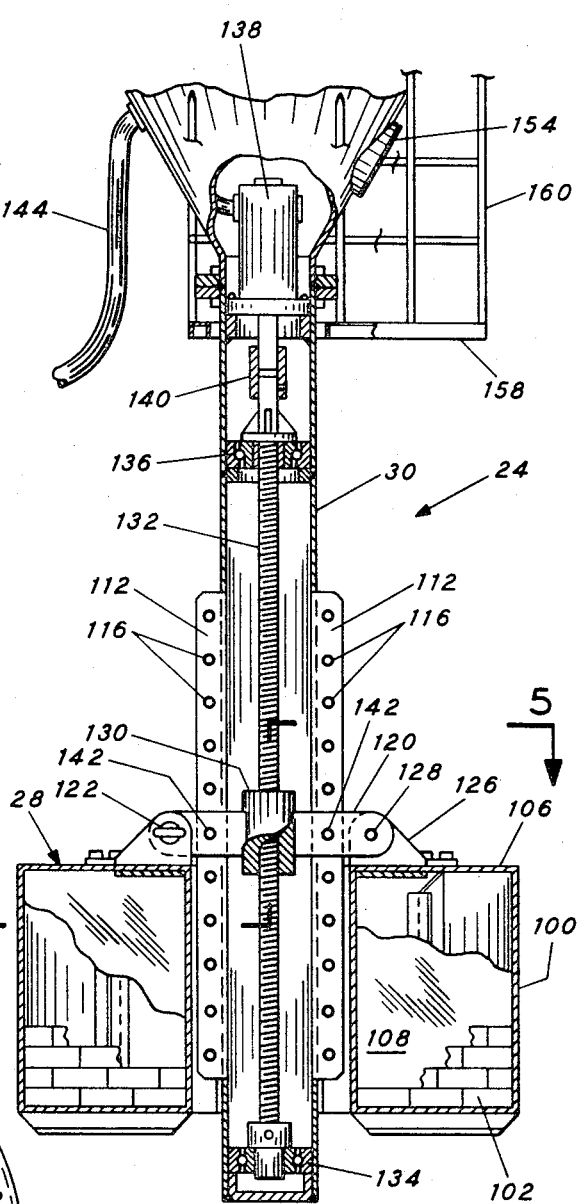
FIG. 4 is a view in elevation and partly in section of details of the tuning means for the pendulum illustrated in FIG. 3.

Referring now to FIGS. 4 and 5, there is illustrated a mechanism for controlling and changing the length of the pendulum arm so that the pendulum may be tuned to respond most readily to the natural frequency of the offshore structure.

The principal pendulum mass 28 comprises a housing 100 which is arranged symmetrically surrounding the lower end portion of the pendulum arm 30. The housing may, of course, be made to contain any weighty solid or liquid material which will supply the desired concentrated mass for the pendulum. The drawings illustrate the preferred use of bricklike bodies of lead 102 to provide the required weight in a relatively small volume and to permit the weight of the mass to be increased or decreased as may be required for maximum effectiveness when there are substantial changes in the deck loading or other operating characteristics of the platform installation. For example, if the offshore installation originally is constructed and used as a drilling platform and subsequently, after the wells are drilled, is changed to a production platform with the drilling machinery removed from it, the weight of the deck loading of the platform will be changed substantially and the natural period of the installation will be affected accordingly. Manholes 104 are provided in the cover 106 of the housing 100 to afford access to its interior. The housing 100 is strengthened and compartmented by radially disposed inner walls 108.

The lower end portion of the pendulum arm 30 has a diametrically disposed slot 110 formed through it. Pairs of flanges 112 and 114 are secured in a unitary manner to each side of the pendulum arm and project radially from it along the longitudinal marginal edges of the slot 110. The complimentary flanges of each pair have aligned holes 116 formed laterally through them to receive a corresponding pin 118. A bar 120, FIG. 4, is secured to the top 106 of the housing 100 on opposite sides of the pendulum arm and is positioned to pass transversely through the slot 110. The bar is detachably secured to the housing by removable pins 122 which are passed through aligned holes 124 formed in ears 126 secured to the top 106 and through corresponding holes 128 formed in each end of the bar 120. Thus the housing 100 is removably attached to the bar 120 for convenience in assembling and disassembling the apparatus.

At the center of and secured to the bar 120 is a nut 130 which in the assembled apparatus is disposed coaxially with the axis of the pendulum arm 30. A screw 132 is threaded into the nut and is disposed along the axis of the pendulum arm extending from a bearing 134 at the lower end of the arm to a thrust bearing 136 in its upper end portion. A motor 138 is mounted in the pendulum arm assembly above and in alignment with the screw 132 and is operably connected to the latter through a coupling 140. The motor rotates the screw to raise or lower the mass 28 to thus change the effective length of the pendulum arm. When the housing 100 has been adjusted to the desired position on the pendulum arm the pins 118 are placed through the aligned holes 116 in the flanges 112 and 114 and corresponding aligned holes 142 in the arm 120 to hold the housing securely in this position and relieve the weight of the mass 28 from the screw 132 and its associated bearings. When the mass 28 is to be adjusted along the pendulum arm, pins 118 are of course removed from the aligned holes while the adjustment is being made. In this manner the period of the pendulum may be adjusted to tune it for proper, i.e., optimum, relationship with the natural period of oscillation of the marine platform assembly.

The drawings indicate the motor 138 as being an electrical motor and a respective flexible electrical conduit 144 connects the motor of each damper with a common source of electrical power 146 aboard the drilling platform as illustrated in FIG. 2. It is well within the skill of the art to supply the switches and controls necessary for both the individual and coordinated operation of the separate electric motors and hence such devices are not illustrated nor described herein.

Obviously other types of motors such as hydraulic or pneumatic can be used for this purpose in place of the electrical motors illustrated.

The upper end portion 34 of the pendulum arm is connected to the lower portion by a conically shaped section 150. This conical configuration provides rigidity to the pendulum arm assembly as well as providing a chamber 152 to enclose the motor 138. A manhole 154 having a water-tight cover 156 is formed through the wall of the conical portion 150 to permit access to the motor for maintenance and repair purposes. A platform 158, FIG. 3, surrounded by a cage 160 is secured to the pendulum arm at the location of the manhole to enable the workmen to function in this area.

RECAPITULATION

The inventive concept is directed to the application of a dynamic damper means to an offshore platform erected in deep open water at a fixed location to control the vibrations and oscillations of the assemblage so that the design limits of stress, displacement and acceleration will not be exceeded. The concept includes transferring the energy incorporated in the movement of the platform to an auxiliary mass attached to the structure in such a fashion that it will be in resonant vibration at the structure's natural period. The oscillation of the auxiliary vibrating mass is damped and its energy dissipated so that it develops a force which opposes the motion of the structure and, therefore, will effectively limit resonant buildup in the structure. The preferred embodiment of this dynamic damping device is the pendulum arrangement described herein. However, it is apparent that modifications might be made to the exemplary apparatus disclosed herein without departing from the inventive concept, and it is intended that the invention include all modifications and equivalents within the scope of the appended claims.

What is claimed is:

1. Means for controlling the oscillation of a marine structure induced by the action of waves on said structure comprising
   a structure positioned in a substantially fixed condition in a body of water and extending vertically through said water to the surface thereof and exposed to wave forces which induce said structure to oscillate,
   an auxiliary mass connected to said structure, means mounting said mass on said structure for movement relative to said structure when said structure is oscillated, and
   restraining means operatively connected to said mass to resist said movement of said mass relative to said structure, said mass and said restraining means being operatively arranged to absorb and dissipate energy from said structure as said structure is induced to oscillate to thereby reduce the amplitude of oscillation of said structure.

2. Apparatus in accordance with claim 1 in which said auxiliary mass is a pendulum mounted on said structure for swinging movement relative thereto when said structure is oscillated by said wave forces, and wherein said restraining means is a body of fluid arranged to resist the swinging movement of said pendulum.

3. Apparatus in accordance with claim 2 in which said pendulum is supported by a gimbal to permit said pendulum swing in a direction which is responsive to a varying direction of oscillation of said structure.

4. Apparatus in accordance with claim 2 including means for adjusting the effective length of said pendulum whereby the period of said pendulum may be adjusted to correspond to the period of said oscillation of said structure.

5. Means for damping vibrations of a marine structure induced by the action of the water waves comprising
   a structure positioned in a body of water and extending from a fixed seat at the bottom of said body of water to the surface thereof and subjected to wave forces which induce said structure to vibrate,
   a support means fixedly attached to said structure to vibrate therewith,
   a bearing means supported by said support means,
   a pendulum means connected to said bearing means for swinging movement relative to such structure and mounted to be swung by vibrations induced in said structure,
   restraining means interposed between said pendulum means and said structure to resist said swinging movement of said pendulum means relative to said structure, said pendulum and said restraining means being operatively arranged to absorb and dissipate energy from said structure as said structure is induced to vibrate.

6. Apparatus in accordance with claim 4 comprising a plurality of said support means attached to said structure in spaced-apart relationship to each other,
   a respective said bearing means supported by each of said support means, and
   a respective said pendulum means connected to each of said bearing means.

7. Apparatus in accordance with claim 5 wherein said restraining means comprises a first plate means connected to said structure to be stationary relative thereto, a second plate means connected to said pendulum means for movement therewith and disposed in adjacent spaced-apart relationship to said first plate means, and a damping liquid placed between and in mutual contact with said first and said second plate means to provide a resisting medium which resists relative motion between said first and said second plate means.

8. Apparatus in accordance with claim 7 wherein said first plate means is connected to said support means and is formed as a portion of a sphere having a center coincident with the center of said swinging movement of said pendulum, and wherein said second plate means is formed as a portion of a sphere and is affixed to said pendulum in concentric relation-ship to said first plate means.

9. Means for controlling the vibrations of a marine structure induced by wave forces acting on said structure comprising
   a structure positioned in a body of water and anchored in a substantially fixed location and exposed to wave forces which induce said structure to vibrate,
   an auxiliary mass,
   means connecting said mass to said structure for movement relative to said structure when said structure vibrates, and
   restraining means operatively connected to said mass to resist said movement of said mass relative to said structure, said mass and said restraining means being operatively arranged to absorb and dissipate energy from said structure as said structure is induced to vibrate to thereby reduce the amplitude of vibration of said structure.

10. Apparatus in accordance with claim 9 in which said auxiliary mass is a pendulum mounted on said structure for swinging movement relative thereto when said structure is vibrated by said wave forces,
    and wherein said restraining means is a body of fluid arranged to resist said swinging movement of said pendulum.

11. Means for controlling the forced synchronous vibrations of a marine structure induced by the action of wave forces on said structure comprising
    a structure arranged to be placed in a body of water in a substantially fixed position in relation to the underwater bottom and exposed to wave forces which induce said structure to vibrate,
    an auxiliary mass,
    means connecting said mass to said structure and permitting movement of said mass relative to said structure when said structure vibrates,
    restraining means for resisting movement of said mass relative to said structure,
    said mass and said restraining means being operatively arranged to absorb and dissipate energy from said structure as said structure is induced to vibrate thereby to reduce the amplitude of vibration of said structure.

12. In combination,
    a structure arranged to be positioned in a body of water in a relatively fixed position in relation to the underwater bottom and exposed to forces which will induce said structure to vibrate,
    an auxiliary mass mounted on said structure for movement relative to said structure when said structure vibrates,
    restraining means for resisting said movement of said mass relative to said structure,
    said mass and said restraining means being operative to absorb energy from said structure as said structure is induced to vibrate,
    said mass and said restraining means being proportioned and arranged to limit the amplitude of vibration of said structure within a predetermined limit.

13. A combination in accordance with claim 12 in which said auxiliary mass is a pendulum mounted on said structure for swinging movement relative thereto, and wherein said restraining means is a body of fluid arranged to resist said swinging movement.

14. In combination, a structure located in a body of water and maintained in a relatively fixed position in relation to the underwater bottom, said structure exposed to forces which induce said structure to vibrate,
    an auxiliary mass,
    means connecting said mass to said structure and constructed to permit movement of said mass relative to said structure as said structure vibrates,
    restraining means for resisting said movement of said mass relative to said structure,
    said mass and said restraining means being operatively arranged to absorb energy from said structure as said structure is induced to vibrate to thereby reduce the amplitude of the vibration induced in said structure.

* * * * *

UNITED STATES PATENT OFFICE
CERTIFICATE OF CORRECTION

Patent No. 3,733,834    Dated May 22, 1973

Inventor(s) Ludwig, deceased

It is certified that error appears in the above-identified patent and that said Letters Patent are hereby corrected as shown below:

On the cover page opposite block [76] Inventor:, delete "Ludwig Ludwig" and insert -- Milton Ludwig -- .

Between the paragraphs opposite the captioned blocks [76] and [22], insert -- [73] Assignee: Chevron Research Company, a Delaware corporation, San Francisco, California -- .

Signed and sealed this 29th day of January 1974.

(SEAL)
Attest:

EDWARD M. FLETCHER, JR.
Attesting Officer

RENE D. TEGTMEYER
Acting Commissioner of Patents